United States Patent
Schrick et al.

[11] Patent Number: 6,029,541
[45] Date of Patent: *Feb. 29, 2000

[54] RECIPROCATING MACHINE WITH NEUTRALIZATION OF FREE INERTIAL FORCES

[75] Inventors: Peter Schrick; Barna Hanula, both of Remscheid, Germany

[73] Assignee: Dr. Schrick GmbH, Remscheid, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/718,320
[22] PCT Filed: Feb. 7, 1995
[86] PCT No.: PCT/EP95/00423
  § 371 Date: Sep. 25, 1996
  § 102(e) Date: Sep. 25, 1996
[87] PCT Pub. No.: WO95/26474
  PCT Pub. Date: Oct. 5, 1995

[30] Foreign Application Priority Data

Mar. 27, 1994 [DE] Germany .............................. 44 10 495

[51] Int. Cl.⁷ ..................................................... F16C 3/04
[52] U.S. Cl. ............................................... 74/604; 74/595
[58] Field of Search .......................... 74/604; 123/192.1; 188/380; 248/550

[56] References Cited

U.S. PATENT DOCUMENTS

| | | | |
|---|---|---|---|
| 1,163,832 | 12/1915 | Lanchester | 74/604 |
| 1,640,634 | 8/1927 | Wise | 123/192.1 |
| 1,738,876 | 12/1929 | Edwards et al. | 74/604 |
| 2,226,571 | 12/1940 | McGoldrick | 188/380 |
| 2,964,272 | 12/1960 | Olson | 248/550 |
| 3,172,630 | 3/1965 | Goodman | 248/638 X |
| 3,468,190 | 9/1969 | Sampietro | 74/604 |
| 3,836,098 | 9/1974 | Miyashita | 244/17.27 |
| 4,724,923 | 2/1988 | Waterman | 181/208 |
| 4,726,253 | 2/1988 | Russell | 74/569 |

FOREIGN PATENT DOCUMENTS

| | | |
|---|---|---|
| 23 33 038 | 1/1975 | Germany . |
| 31 37 933 | 4/1983 | Germany . |
| 3234980 | 3/1984 | Germany . |
| 49-4078 | 1/1974 | Japan . |
| 52-56192 | 10/1975 | Japan . |
| 54-25593 | 8/1979 | Japan . |
| 56-42782 | 10/1981 | Japan . |
| 57-33247 | 2/1982 | Japan . |
| 50-102842 | 6/1983 | Japan . |
| 59-98147 | 7/1984 | Japan . |
| 62-15640 | 1/1987 | Japan . |
| 63-94338 | 6/1988 | Japan . |
| 2-18360 | 5/1990 | Japan . |
| 2-85054 | 7/1990 | Japan . |
| 2-305385 | 12/1990 | Japan . |

OTHER PUBLICATIONS

English translation of Office Action of Sep. 22, 1998 in Japanese Application No. 7–524915 filed on Aug. 14, 1998.

*Primary Examiner*—Vinh T. Luong
*Attorney, Agent, or Firm*—Synnestvedt & Lechner LLP

[57] ABSTRACT

In a reciprocating machine having piston/cylinder units arranged in line, a cam member having diametrically opposed cams is fixed to a crankshaft with the cam member arranged in a central transverse plane. A balancing mass is in contact with the cam member by way of a cam roller. The cam roller is maintained in permanent contact with the cam member by a compression spring which is seated against the machine. The cams are identical and neutralize second order free inertial forces.

21 Claims, 8 Drawing Sheets

RECIPROCATING MACHINE WITH NEUTRALIZATION OF FREE INERTIAL FORCES

BACKGROUND OF THE INVENTION

The invention relates to a reciprocating machine.

BACKGROUND OF THE INVENTION

Several constructions of reciprocating machines, particularly those with only one piston/cylinder unit and those with a plurality of piston/cylinder units arranged in line, produce free inertial forces. These free inertial forces lead, among other things, to not inconsiderable vibrational loads on the structural components and to reductions in comfort, for example in passenger vehicles.

In one known reciprocating machine of the type first mentioned above (DE 23 33 038 A1), the balancing mass in all the illustrated embodiments is guided in an arcuate path and is maintained in contact with cams of a cam member. According to one embodiment, in the case of a 4-cylinder in-line engine, the two crank webs adjacent to the central crankshaft main bearing are formed as cam discs offset relative to one another in the circumferential direction, while the balancing mass consists of a balancing rocker arm which is substantially H-shaped in plan view and which is arranged to be raised and lowered about an axis which extends parallel to the crank shaft axis. This construction is expensive and demands considerable lateral space in the reciprocating machine.

From DE 31 37 933 A1 it is known to drive at least one balancing mass in phase opposition to the working piston from a separate lifting pin of the crankshaft via a balancing connecting rod. The balancing mass is guided for oscillating movement on an arcuate path by means of a rocker mounted pivotably on the machine housing. The rocker is arranged substantially parallel to the axis of the crankshaft. Again, this is an expensive construction which requires considerable space below the crankshaft.

From U.S. Pat. No. 4,724,923 A there is known a vibration damper in which a damping mass with air gap on both sides is suspended by means of springs on U-shaped yokes of electromagnets. A coil is provided on each limb of each yoke. The current flux through the coils is controllable in order to vary the fundamental frequency of the vibration damper. The yokes are fixed to those components whose vibrations are to be damped, in other words to the excited components. The vibration damper reduces the amplitude of vibrations which are present, but does not however prevent vibrations arising. The passive movements of the damping mass are produced by the vibrations of the components which are to be damped and not by the vibration damper. In the present invention, on the other hand, the balancing mass moves actively in a controlled manner and thereby at least substantially prevents any excitation toward the reciprocating machine. In other words, it carries out a neutralization of free inertial forces at the source.

It is the object of the invention to reduce the constructional and operational cost for the neutralization of the free inertial forces.

This object is achieved by the features of claim 1 or claim 20 or claim 22. References to reciprocating machines mean in particular internal combustion engines.

SUMMARY OF THE INVENTION

The desired neutralization of the free inertial forces can be achieved in a simple manner. Free inertial forces of the first order can be balanced with the crankshaft frequency, and free inertial forces of the second order can be balanced with double the crankshaft frequency. Progressively acting vibratory springs can be used for example.

In accordance with the present invention, one creates an oscillatory drive which is well adapted to be remotely controlled and which has very good performance.

The drive motor can be electrical or hydraulic or pneumatic. An eccentric can be used instead of the crank. If the crank or the eccentric rotates with the speed of rotation of the crankshaft of the reciprocating machine, then free inertial forces of the first order are neutralized. With double the speed of rotation of the crankshaft, one achieves a neutralization of the free inertial forces of the second order.

In a simple way, one can neutralize first order free inertial forces if the shaft either is the crankshaft of the reciprocating machine or rotates at the same speed of rotation as this. Correspondingly, second order free inertial forces are neutralized if the shaft has two identical cams set diametrically opposite each other. The follower element can be for example a tappet member with a cam roller and be maintained always in contact with the cam member by means of a spring.

The apparatus of the present invention demands only little space. Preferably, the cam member is made in one piece with the crankshaft of the reciprocating machine. The cams can then be ground in a simple manner on the crankshaft. In practice, it is generally sufficient to neutralize the first and second order free inertial forces. With the conventional in-line engines, the first order free inertial forces are neutralized without special measures. The arcuate path of the balancing mass is the best possible match to a line parallel to the longitudinal axis of the cylinder. Preferably, the balancing mass is arranged below the crankshaft of the reciprocating machine.

The features of the invention open up the possibility of forming the cam member for example on an already provided crank web of the crankshaft of the reciprocating machine.

One achieves a simpler and more cost effective neutralization of the first and second order free inertial forces, for example in a reciprocating machine with only one piston/cylinder unit.

BRIEF DESCRIPTION OF THE DRAWINGS

These and further features and advantages of the invention will become more apparent from the following description of a number of embodiments which are given by way of example and which are shown in the drawings. In the drawings.

DETAILED DESCRIPTION OF THE INVENTION

Figures 1, 2:
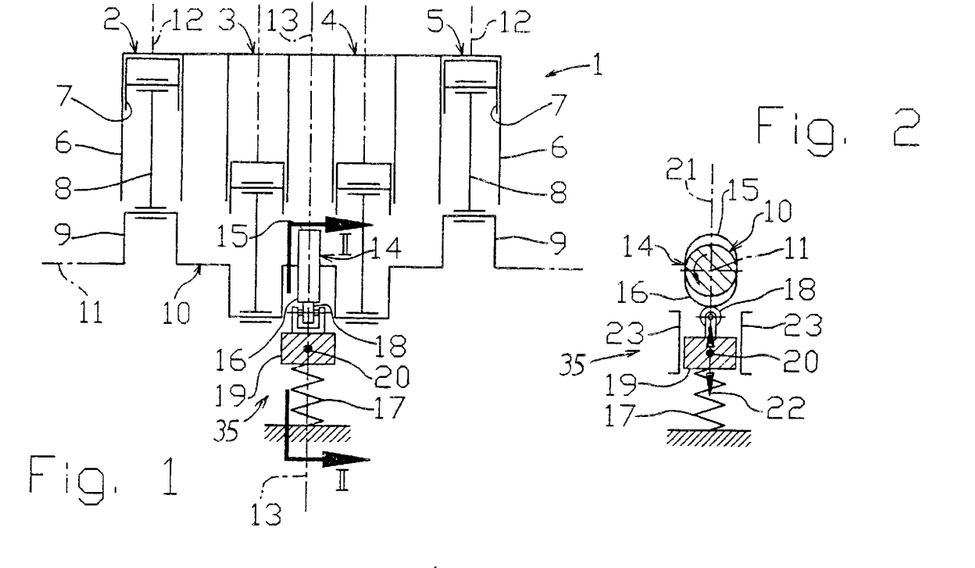
FIG. 1 is a schematic longitudinal section through a 4-cylinder reciprocating machine, for example an internal combustion engine.
FIG. 2 is the sectional view taken along the line II—II in FIG. 1.

FIG. 1 shows a 4-cylinder reciprocating machine 1 having four piston/cylinder units 2 to 5 arranged in line. Each of the units 2 to 5 includes a piston 7 oscillating in a cylinder 6, with the piston being coupled to a crank 9 of a crankshaft 10 by means of a connecting rod 8. A longitudinal axis of the crankshaft 10 is indicated at 11 and longitudinal axes of the cylinders 6 at 12.

On account of the symmetrical construction of the reciprocating machine 1, a balancing device 35 is provided in a central transverse plane 13 of the reciprocating machine 1. On the crankshaft 10 is fixed a cam member 14 which has diametrically opposed cams 15 and 16. Preferably, the cam member 14 is integral with the crankshaft 10 and the cams 15, 16 are ground on the crankshaft 10.

By means of a compression spring 17 which is seated against a fixed machine surface, a cam roller 18 of a balancing mass 19 is maintained in permanent contact with the cam member 14. The center of mass 20 of the balancing mass 19 lies on the one hand in the central transverse plane 13 and on the other hand in a longitudinal plane 21 (FIG. 2) of the reciprocating machine 1 extending at least approximately through the common center of mass of the pistons 7 and of the oscillating parts of the connecting rods 8.

Normally, with such in-line piston machines, the first order free inertial forces are neutralized anyway. Here, the invention is essentially concerned with the neutralization of the second order free inertial forces. The two cams 15, 16 serve this purpose. They are shaped with one below the other and are so designed that the balancing mass 19 executes a movement which is sinusoidal or at least similar to sinusoidal with time.

In FIG. 2 the directions of movement of the center of mass 20 are indicated by a double-headed arrow 22. A longitudinal guide 23 which is fixed to the machine ensures that the center of mass 20 always moves parallel to the longitudinal axes 12 of the cylinders 6.

In all the Figures of the drawings, the same or corresponding parts are indicated by the respective same reference numerals.

Figure 3:
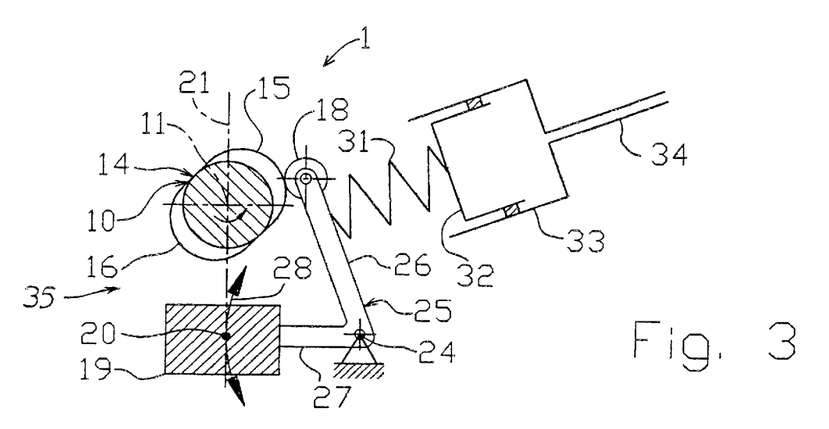
FIG. 3 is a schematic view, partly in section, of another balancing device.

In FIG. 3, the balancing mass 19 of the balancing device 35 includes an angled lever 25 mounted on a bearing 24 which is fixed to the machine, with the lever being capable of being raised and lowered. A free end of a first arm 26 of the angled lever 25 carries the cam roller 18 which rolls on the cam member 14. On a second arm 27 of the angled lever 25 is located the center of mass 20 of the balancing mass 19 also comprising the angled lever 25 and its cam roller 18. The center of mass 20 is in this case guided on an arcuate path 28 centered on the machine-fixed bearing 24 such that the center of the arcuate path 28, in the middle of the stroke of the cams 15 and 16, contacts the longitudinal plane 21 of the piston-operated machine 1. This state is illustrated diagrammatically in FIG. 3.

Figure 4:
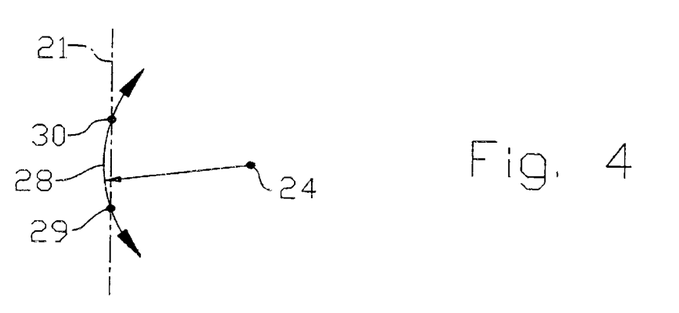
FIG. 4 shows a modified detail from FIG. 3, as a schematic illustration.

FIG. 4 shows a modification as compared to FIG. 3, in that here the arcuate path 28 passes through the longitudinal plane 21 of the reciprocating machine 1 at two points 29 and 30. In this way the arcuate path 28, as the track of the center of mass 20, can approximate as far as possible to the longitudinal plane 21. In FIG. 3, a compression spring 31 extends perpendicularly from the first arm 26, and is seated at its other end against a piston 32. The piston 32 is guided sealingly in a hydraulic cylinder 33 which is supplied with pressurized fluid through a pipe 34. Thus, in dependence upon the speed of rotation of the reciprocating machine 1, the force with which the cam roller 18 is urged against the cam member 14 can be varied.

Figure 5:
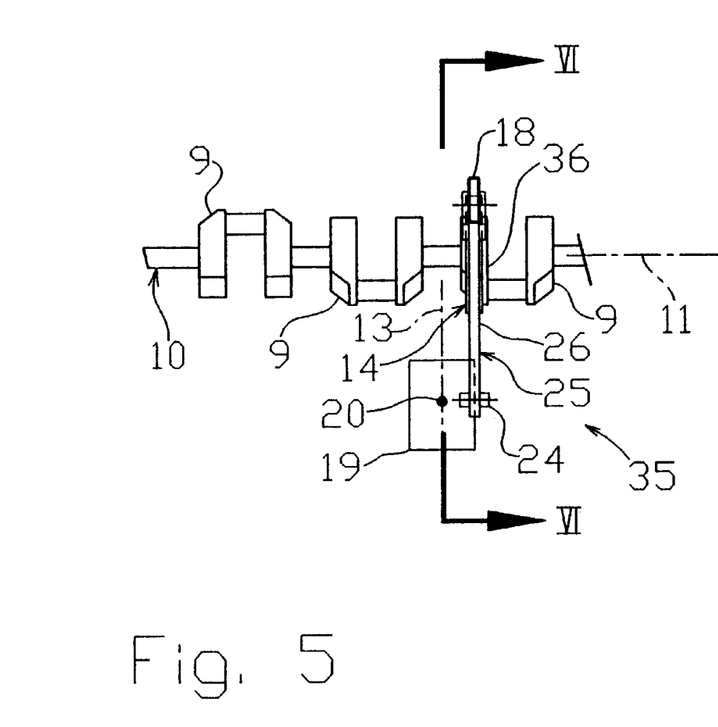
FIG. 5 is a side view of a further balancing device.

FIG. 5 shows a balancing device 35 for the free inertial forces which differs from that shown in FIG. 3. The cam member 14 is here arranged offset in relation to the center of mass 20 in the direction of the longitudinal axis 11 of the crankshaft, and is formed on a crank web 36 of one of the cranks 9. The crank web 36 carrying the cam member 14 is adjacent to the central transverse plane 13 in which again the center of mass 20 is guided.

Figure 6:
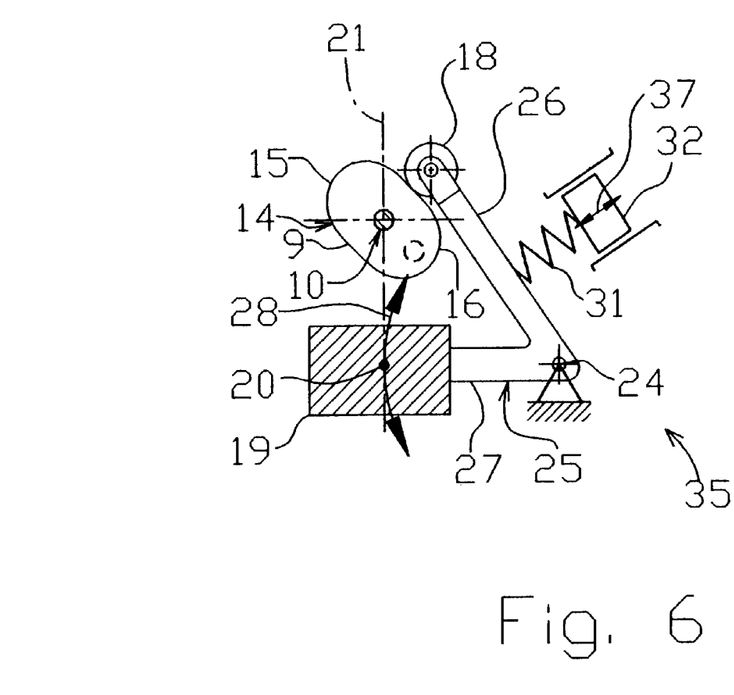
FIG. 6 is the sectional view taken along the line VI—VI in FIG. 5.

According to FIG. 6, the piston 32 is adjustable in any manner in the direction of the double-headed arrow 37, such that the cam roller 18 remains in every case in contact with the cam body 14.

Figure 7:
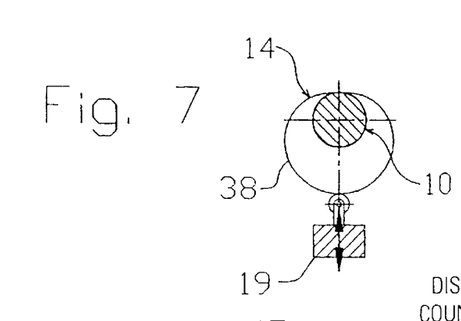
FIG. 7 shows a balancing device with a cam shape for the neutralization of first order free inertial forces.

FIG. 7 illustrates the design of a cam 38 for the case where only first order free inertial forces have to be neutralized.

Figures 8, 10, 12:
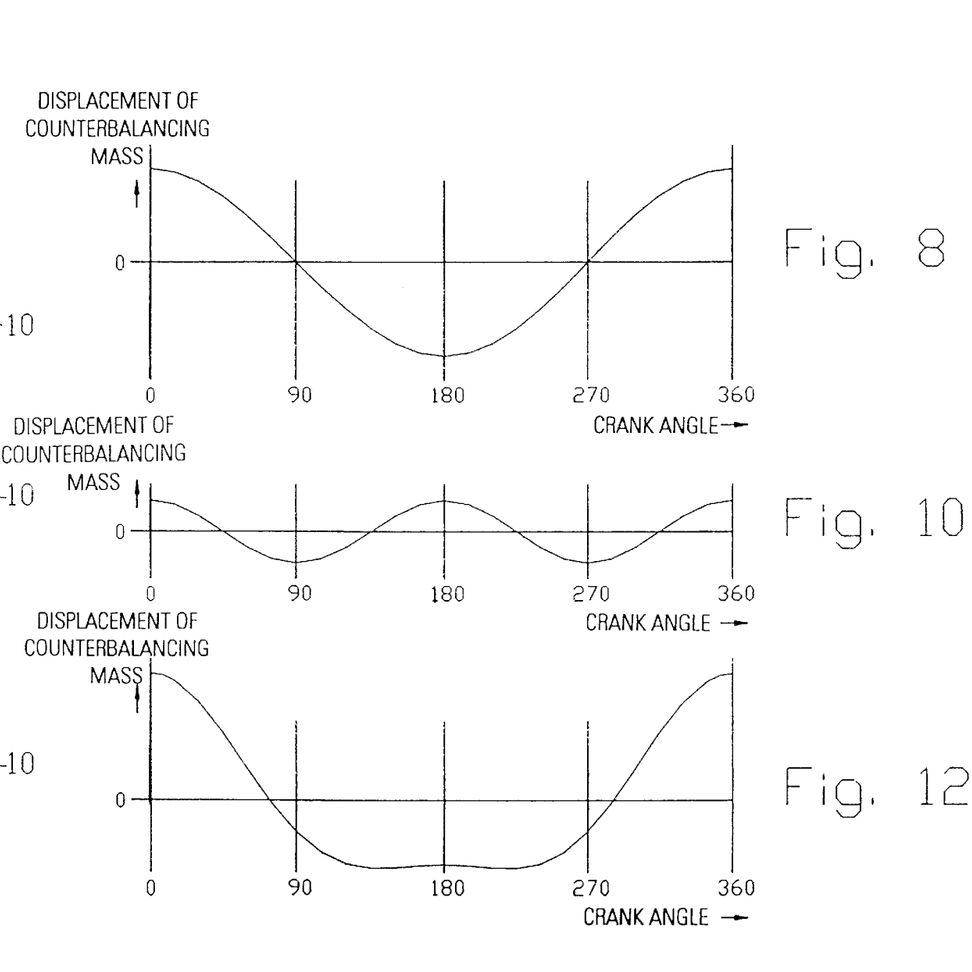
FIG. 8 shows the displacement/crank angle diagram relevant to FIG. 7.
FIG. 10 shows the displacement/crank angle diagram relevant to FIG. 9.
FIG. 12 is the displacement/crank angle diagram relevant to FIG. 11.

FIG. 8 represents the diagram of the displacement of the balancing mass 19 in relation to the crank angle, associated with FIG. 7.

Figure 9:
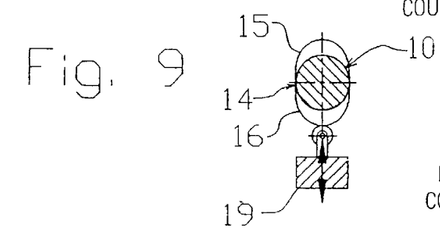
FIG. 9 shows another balancing device with a cam shape for the neutralization of second order free inertial forces.

In FIG. 9 is represented that cam body 14 with the two diametrically opposed cams 15, 16 which is shown in FIGS. 1 and 2. In this case, only second order free inertial forces are to be neutralized.

FIG. 10 is the displacement/crank angle diagram associated with FIG. 9.

Figure 11:
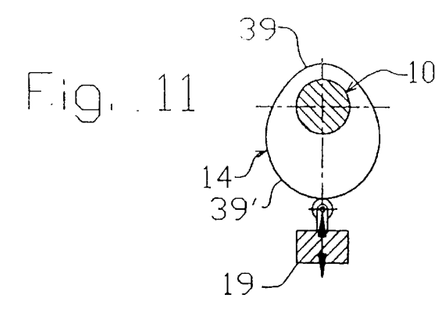
FIG. 11 shows a balancing device with a cam shape for the neutralization of first and second order free inertial forces.

FIG. 11 shows two diametrically opposed cams 39 and 39' of the cam body 14, with the cams merging into each other, and for the case where first and second order free inertial forces have to be neutralized simultaneously.

FIG. 12 represents the displacement/crank angle diagram associated with FIG. 11.

From the diagrams of FIGS. 8, 10 and 12 it is apparent that the balancing mass 19 in the desired manner performs a sinusoidal or at least approximately sinusoidal movement.

FIGS. 13–21 and the following text relate to additional embodiments of the invention employing means for varying the spring rate of the system in dependence upon the speed of rotation of the reciprocating machine so that a fundamental frequency of the oscillatory spring/balancing mass system follows the speed of rotation of the reciprocating machine synchronously and varying the stroke of the oscillatory spring/balancing mass system by displacement of the phase position of the oscillatory drive relative to the oscillatory spring/balancing mass system, whereby the energy exchanged with the oscillatory spring/balancing mass system is controlled to neutralize the free inertial forces.

Figure 13:
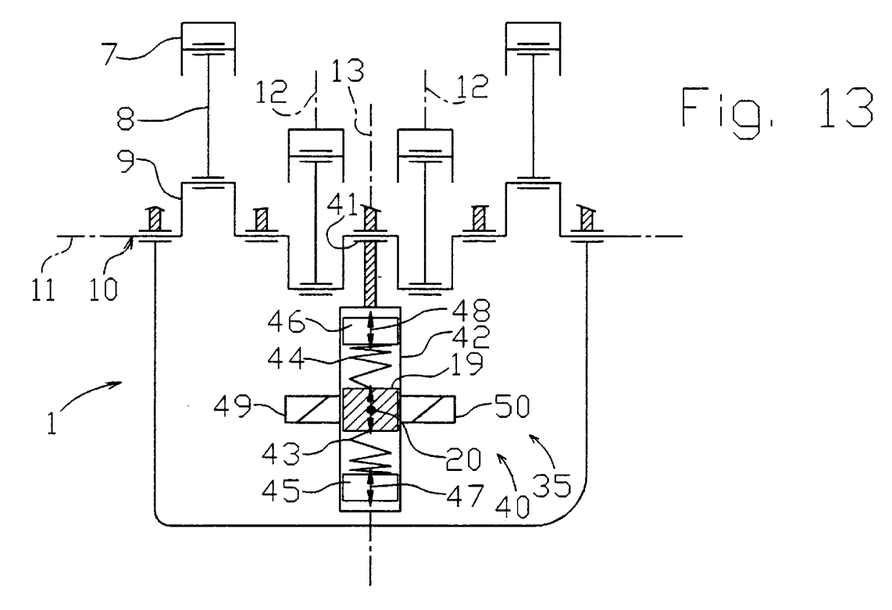
FIG. 13 is a schematic longitudinal section through a reciprocating machine with yet a further balancing device; and, FIG. 14 shows another balancing device with a drive motor that drives a crank rotationally.

FIG. 13 is a schematic illustration of a reciprocating machine 1 corresponding to FIG. 1. Here, a balancing device 35 formed as an oscillating spring/balancing mass system 40 is used which is connected rigidly to the crank housing of the reciprocating machine 1, for example to a main bearing cover 41 of the crankshaft 10. The center of mass 20 of the balancing mass is again here guided parallel to the longitudinal axes 12 of the cylinders 6 (FIG. 1) in the central transverse plane 13 of the reciprocating machine 1. A longitudinal guide 42 takes care of this guidance. The balancing mass 19 is supported in each direction of movement by is respective progressively acting oscillating springs 43 and 44. Stops 45 and 46 for the oscillating springs 43 and 44 are fixed to the machine and are adjustable in the directions of the double-headed arrows 47 and 48 for changing the force per unit distance of displacement of the balancing mass from its neutral position exerted by the oscillatory springs 43, 44. Controllable electromagnets 49 and 50 positioned laterally of the longitudinal guide 42 take care of the oscillatory excitation of the balancing mass 19.

Figure 14:
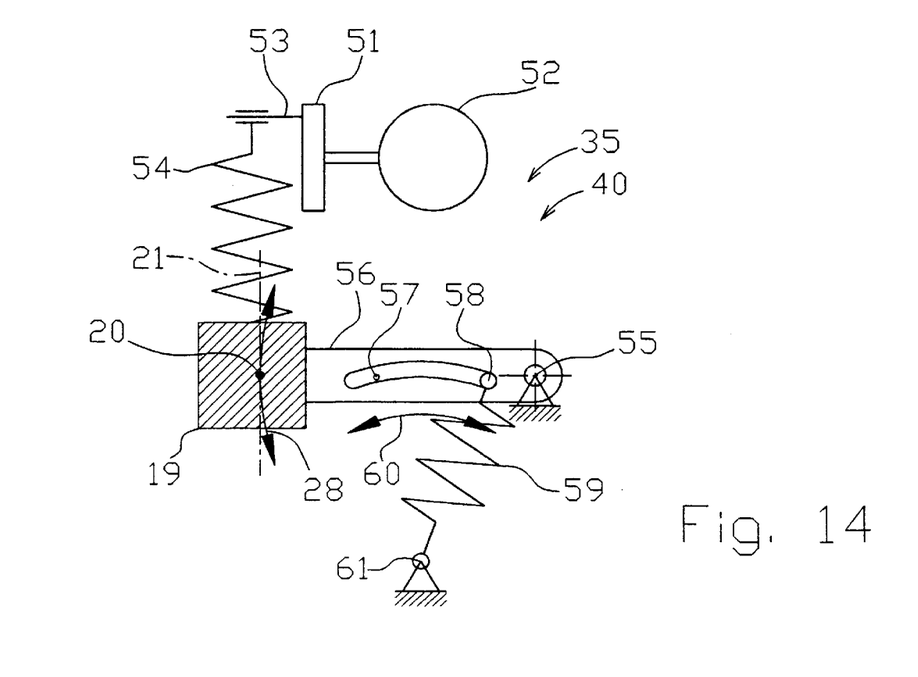
Figure 15:
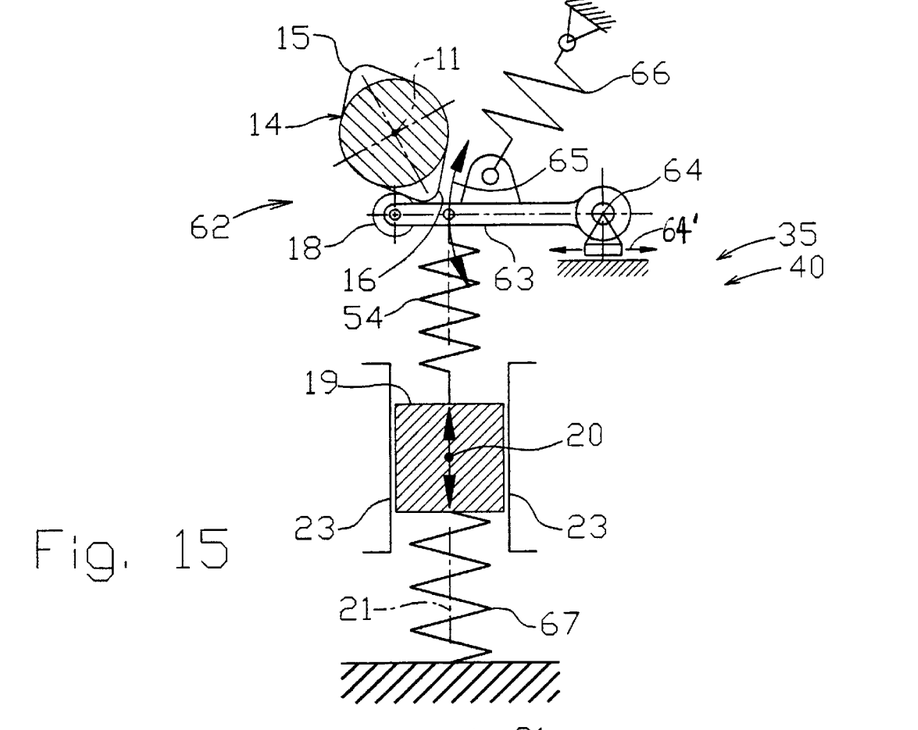
FIG. 15 shows another balancing device having a cam drive and a follower element.

FIG. 14 shows yet another balancing device 35. Here, the oscillatory drive for the balancing mass 19 comprises a drive motor 52 which drives a crank 51 or an eccentric rotationally. A crank pin 53 of the crank 51 is connected elastically by means of a coupling spring 54 to the balancing mass 19. The balancing mass 19 comprises an arm 56 mounted fixedly to the machine at its free end at 55. The arm 56 is provided with a longitudinal slot 57 in which a first connecting point 58 of an oscillatory spring 59 formed as a tension/compression spring is displaceable in the directions of the double-headed arrow 60 for changing the fundamental frequency of the oscillatory spring/balancing mass system 40. The longitudinal slot 57 is in the form of an arcuate slot centered about a second connection point 61 of S the oscillatory spring 59 which is fixed to the machine. The center of mass 20 of the balancing mass 19 is in this case, as in FIG. 3, so guided that the center of the arcuate track 28 contacts the longitudinal plane 21. The center of mass 20 could alternatively be guided in the manner shown in FIG. 4.

In the balancing device 35 shown in FIG. 15, which is again different, the oscillatory drive for the balancing mass 19 comprises a cam drive 62 with a follower element 63 formed as a tappet member and movable by the cams 15, 16 of the cam body 14. The follower element 63 is mounted on a bearing 64 which is displaceable on the reciprocating machine 1 in the directions of a double-headed arrow 64', so that it can execute an arcuate lifting and sinking movement in the directions of a double-headed arrow 65. The follower element 63 is in contact with the cam body by way of the cam roller 18. For permanent contact, there is provided a tension spring 66 which is hung from a point fixed to the machine. The follower element 63 is connected elastically to the balancing mass 19 by means of the coupling spring 54. The balancing mass 19 is guided parallel to the longitudinal axes 12 (FIG. 1) of the cylinders 6 by means of the longitudinal guide 23, and is in contact with an oscillatory spring 67 which is seated at its lower end on a surface which is fixed to the machine.

Figure 16:
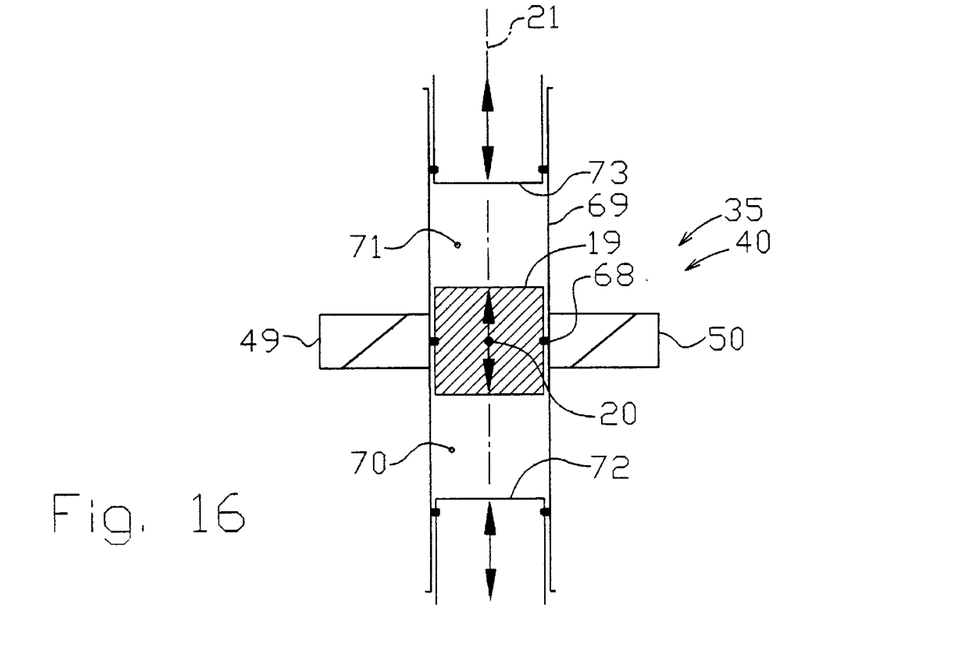
FIG. 16 shows yet another balancing device in which a balancing mass is guided by means of a seal in a cylinder.

FIG. 16 shows yet another balancing device 35, in which here the balancing mass 19 is guided by means of a seal 68 sealing in a cylinder 69 parallel to the longitudinal axes 12 (FIG. 1) having first and second ends defined by pistons 72 and 73 as described more fully below. At each end face of the balancing mass 19 is arranged a gas-filled cylinder chamber 70 and 71 acting as an oscillatory spring. The cylinder chambers 70, 71 are each delimited by a piston 72 and 73 respectively which is displaceable in gas-tight manner in the cylinder 69 for the adaptation of the spring rate. The oscillatory drive is again effected here by means of the controllable electromagnets 49 and 50.

Figure 17:
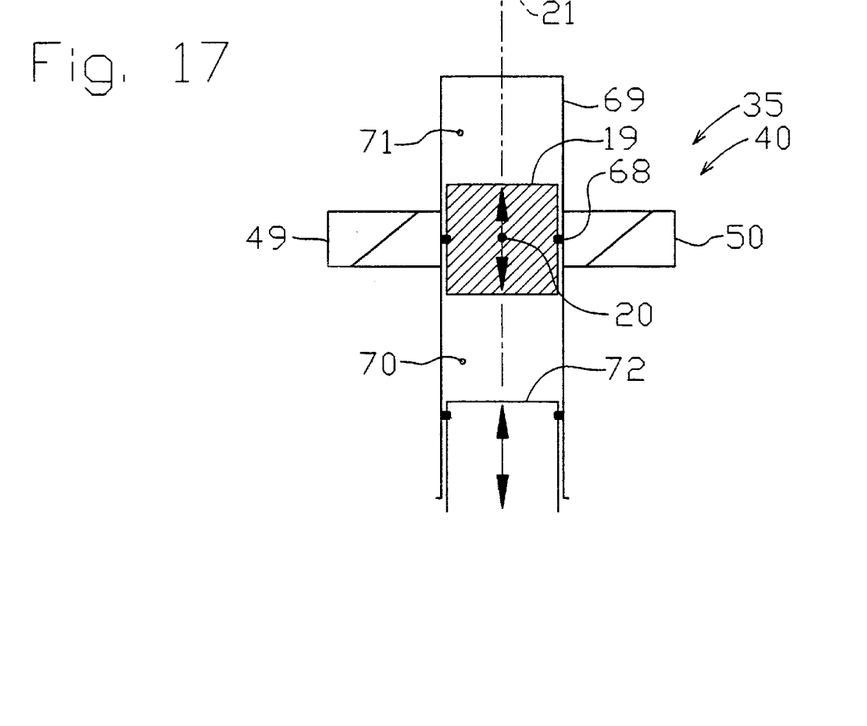
FIG. 17 shows another balancing device similar to that shown in FIG. 16 but being closed at the top.

The embodiment according to FIG. 17 is similar to that of FIG. 16. However, in FIG. 17, the cylinder 69 is closed at the top, so that one only has the axially adjustable piston 72 at the bottom.

Figure 18:
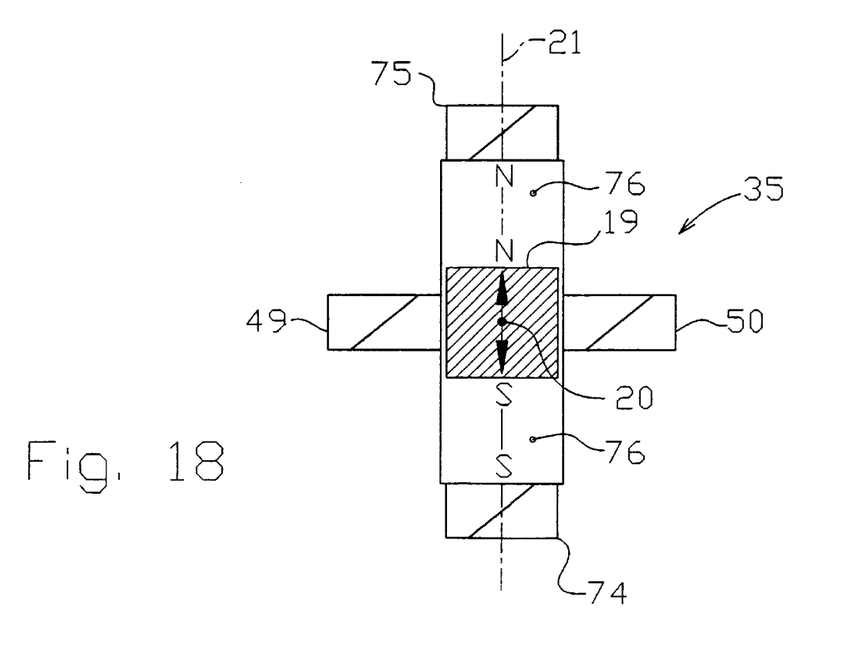
FIG. 18 shows another balancing device in which the balancing mass is formed as a permanent magnet.

In the balancing device 35 according to FIG. 18, the balancing mass 19 is formed as a permanent magnet and has a north pole N in its one direction of movement and a south pole S in its other direction of movement. Electromagnets 74 and 75 which are fixed to the machine are provided as oscillatory springs at the ends of the path of movement of the balancing mass. The force per unit distance of displacement of the balancing mass from its neutral position exerted by the oscillatory springs is adaptable to the speed of rotation of the reciprocating machine by appropriate electrical control of the electromagnets 74, 75. In order to reduce the friction, the balancing mass 19 is movable in an evacuated cylinder space 76. The oscillatory drive is again controlled by the controllable electromagnets 49, 50.

Figure 19:
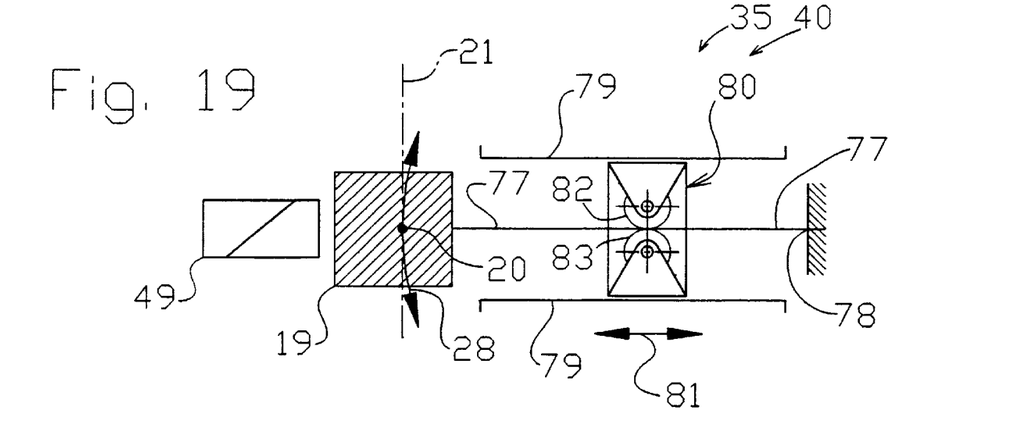
FIG. 19 shows another balancing device having an oscillatory spring formed as a flexural spring.

In the alternative balancing device 35 shown in FIG. 19, the oscillatory spring 77 is formed as a flexural spring extending transversely to the directions of movement of the balancing mass 19 and fixed to the machine at the free end at 78. A carriage as a support bearing 80 for the oscillatory spring 77 is displaceable and adjustable in a linear guide 79 in the directions of a double-headed arrow 81. The support bearing 80 comprises support rollers 82 and 83 which press against opposite sides of the oscillatory spring 77. Thus, the center of mass 20 of the balancing mass 19 in this case is guided on the arcuate path 28 with a radius which is dependent upon the particular setting of the support bearing 80.

Figure 20:
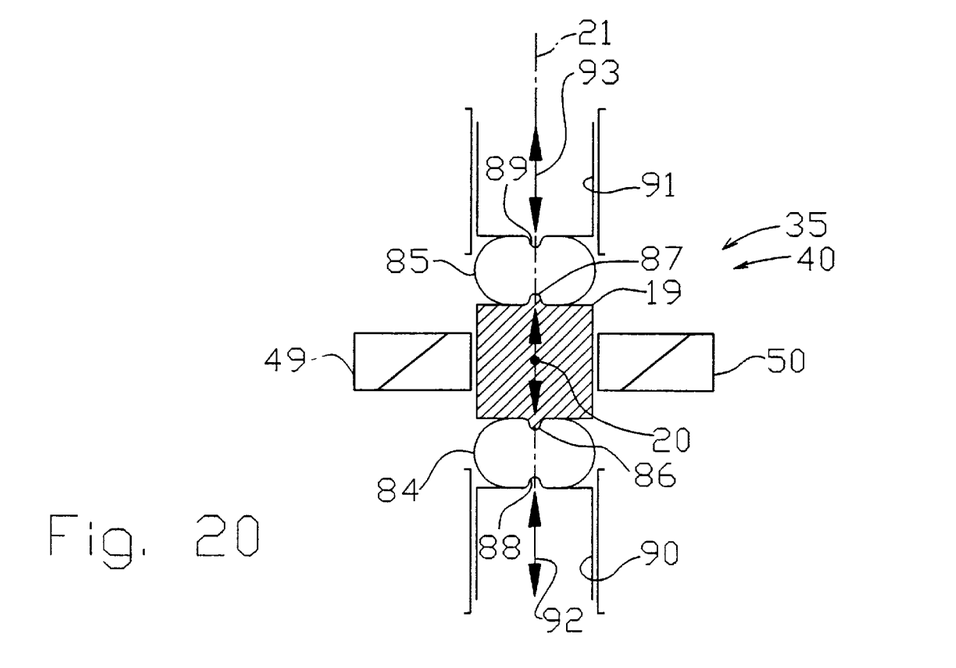
FIG. 20 shows another balancing device having an oscillatory spring formed as a gas spring bellows.

In the case of the balancing device 35 shown in FIG. 20, each oscillatory spring is formed as a gas spring bellows 84 and 85. The balancing mass 19 is centered relative to the gas spring bellows 84, 85 by shape-locking connections 86 and 87. The gas spring bellows 84, 85 are for their part centered relative to the machine-fixed abutments 90 and 91 by means of shape-locking connections 88 and 89. The abutments 90, 91 can be adjusted in the directions of the double-headed arrows 92 and 93 in order to vary the force per unit distance of displacement of the balancing mass from its neutral position exerted by the gas spring bellows. The oscillatory drive is again effected by means of the controllable electromagnets 49, 50.

Figure 21:
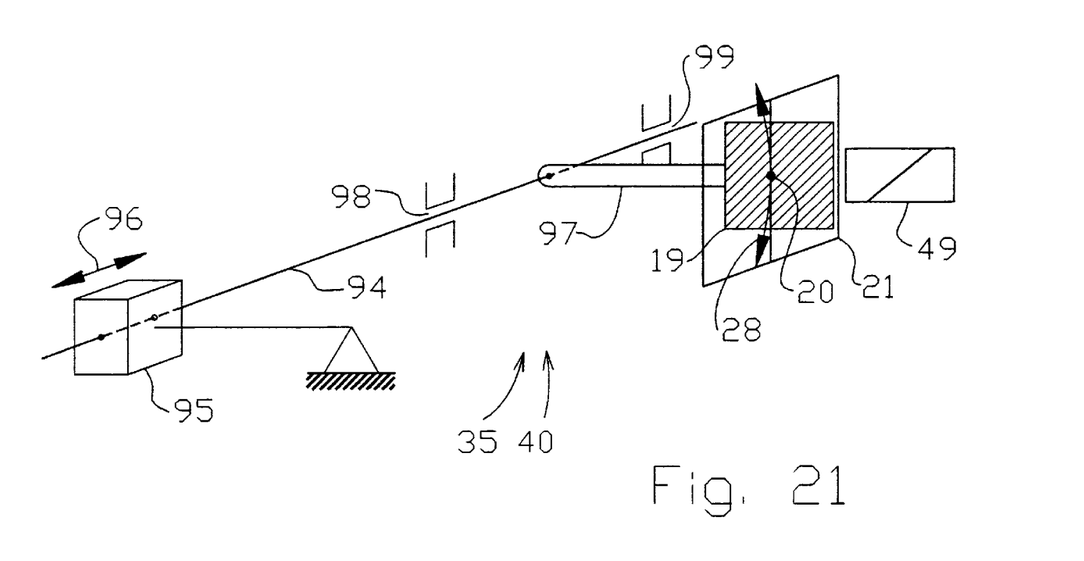
FIG. 21 shows another balancing device having an oscillatory spring formed as a torsion spring extending transverse to the direction of movement of the balancing mass.

In the yet further balancing device 35 shown in FIG. 21, the oscillatory spring 94 is formed as a torsion spring extending transversely to the directions of movement (see 28) of the balancing mass 19 and fixed against rotation to the machine at the free end in a support bearing 95. The force per unit distance of displacement of the balancing mass from its neutral position exerted by the torsion spring is variable by displacement of the support bearing 95 in the longitudinal direction of the torsion spring in the directions of the double-headed arrow 96. A non-circular, shape-locking connection is provided between the oscillatory spring 94 and the support bearing 95.

The balancing mass 19 comprises an arm 97 which is fixed to the oscillatory spring 94 and extends perpendicular to the oscillatory spring 94. The arm 97 is preferably arranged between guide bearings 98 and 99 of the oscillatory spring 94 which are fixed to the machine. The oscillatory drive is effected here by the controllable electromagnet 49 in a similar manner to that of the balancing device 35 shown in FIG. 19.

We claim:

1. A reciprocating machine comprising:
    at least one piston/cylinder unit, each unit comprising:
        a cylinder and a piston arranged to oscillate within said cylinder along a longitudinal axis of said cylinder;
        a crankshaft; and
        a connecting rod coupling said piston to said crankshaft, wherein said piston and part of said connecting rod oscillate thereby producing free inertial forces in the direction of the longitudinal axis of said cylinder;
    an oscillatory spring/balancing mass system comprising an oscillating balancing mass displaceable back and forth from a neutral position through a stroke with time to produce balancing inertial forces at least approximately counterbalancing the free inertial forces, and at least one oscillatory spring, said spring being seated fixedly on the machine and positioned to subject the balancing mass in its back and forth movement to a force of said spring;
    an oscillatory drive disposed to effect an oscillatory excitation on said oscillatory spring/balancing mass system from its rest position at a multiple of the frequency of the crankshaft depending upon the order of the free inertial forces to be neutralized, said oscillatory drive having a phase position relative to said oscillatory spring/balancing mass system;
    means for varying the force applied by said spring to said balancing mass per unit distance displacement of said balancing mass from said neutral position in dependence upon the speed of rotation of the reciprocating machine so that a fundamental frequency of the oscillatory spring/balancing mass system follows the speed of rotation of the reciprocating machine synchronously; and
    means for varying said stroke of said oscillatory spring/balancing mass system by displacement of said phase position of said oscillatory drive relative to the oscillatory spring/balancing mass system;
    whereby the energy exchanged with said oscillatory spring/balancing mass system is controlled to neutralize the free inertial forces.

2. A reciprocating machine according to claim 1 wherein said oscillatory drive comprises at least one controllable electromagnet.

3. A reciprocating machine according to claim 1 wherein said oscillatory spring is progressively acting.

4. A reciprocating machine according to claim 1 wherein the oscillatory drive comprises a drive motor, a crank rotationally driven by said drive motor and having a crank pin, and a coupling spring elastically connecting said balancing mass to said crank pin.

5. A reciprocating machine according to claim 4 wherein the phase position of the oscillatory drive is displaceable by displacing a phase position of the crank pin relative to the oscillating oscillatory spring/balancing mass system.

6. A reciprocating machine according to claim 1 wherein said oscillatory drive comprises:
    a cam gear having at least one cam which rotates with a shaft,
    a follower element moving responsive to said cam, and
    wherein said follower element is connected elastically to said balancing mass by a coupling spring.

7. A reciprocating machine according to claim 6 further comprising a bearing about which said follower element can be raised and lowered, said bearing being displaceable on the reciprocating machine to change the phase position of the oscillatory drive.

8. A reciprocating machine according to claim 6 wherein the shaft which rotates with said cam is angularly adjustable relative to the crankshaft to change the phase position of the oscillatory drive.

9. A reciprocating machine according to claim 1 having an oscillatory spring disposed to support the balancing mass in each direction of movement of the balancing mass, wherein each said oscillatory spring includes a stop fixed to the machine, and wherein at least one said stop is adjustable in both directions of movement of the balancing mass for changing the force applied by said spring to said balancing mass per unit distance displacement of said balancing mass from said neutral position.

10. A reciprocating machine according to claim 9 wherein each said oscillatory spring comprises a gas spring bellows.

11. A reciprocating machine according to claim 10 wherein the balancing mass is centered relative to the gas spring bellows by means of shape-locking connections.

12. A reciprocating machine according to claim 10 wherein each said gas spring bellows is centered relative to its stop by a shape-locking connection.

13. A reciprocating machine according to claim 1 wherein the balancing mass includes an arm having a longitudinal slot, said arm having a free end mounted fixedly to the machine to allow pivotal movement, wherein the oscillatory spring is formed as a tensile compression spring having a first connection point connected to said arm so as to be displaceable in said longitudinal slot for changing the fundamental frequency of the oscillatory spring/balancing mass system, and said oscillatory spring having a second connection point mounted fixedly on the machine.

14. A reciprocating machine according to claim 13 wherein the longitudinal slot is formed as an arcuate slot centered about the second connection point.

15. A reciprocating machine according to claim 1 wherein the balancing mass comprises a permanent magnet having a north pole in its one direction of movement and a south pole in its other direction of movement, and wherein said at least one oscillator spring comprises first and second oscillatory springs, said first and second oscillatory springs comprise two electromagnets fixed to the machine on the path of movement of the balancing mass, and wherein the force applied by the oscillatory springs to said balancing mass per unit distance displacement of said balancing mass from said neutral position is capable of being adapted to the speed of rotation of said reciprocating machine by an electrical control of the electromagnets.

16. A reciprocating machine according to claim 15 wherein the balancing mass is movable in an evacuated cylindrical chamber.

17. A reciprocating machine according to claim 1 wherein the oscillatory spring comprises a flexural spring fixed to the machine at its free end and extending transversely to the directions of movement of the balancing mass, wherein said flexural spring is also supported by a support bearing seated fixedly on the machine, and wherein the force applied by the flexural spring to said balancing mass per unit distance displacement of said balancing mass from said neutral position is capable of being varied by displacement of said support bearing in the longitudinal direction of the flexural spring.

18. A reciprocating machine according to claim 1 wherein the oscillatory spring is formed as a torsion spring extending transversely to the direction of movement of the balancing mass, wherein said balancing mass includes an arm fixed to said torsion spring, wherein said torsion spring is fixed against rotation to a support bearing seated fixedly to the machine, and wherein said support bearing is displaceable along the torsion spring to adjust the force applied by the torsion spring to said balancing mass per unit distance displacement of said balancing mass from said neutral position.

19. A reciprocating machine according to claim 1 wherein a longitudinal plane of the reciprocating machine extends through a common center of mass of the piston and of the oscillating part of the connecting rod and parallel to the longitudinal axis of the cylinder, and the center of mass of the balancing mass is guided on an arcuate path such that the center of the arc contacts the longitudinal plane of the reciprocating machine.

20. A reciprocating machine according to claim 1 wherein a longitudinal plane of the reciprocating machine extends through a common center of mass of the piston and of the oscillating part of the connecting rod and parallel to the longitudinal axis of the cylinder, and the center of mass of the balancing mass is guided on an arcuate path such that the arcuate path passes through the longitudinal plane of the reciprocating machine at two points.

21. A reciprocating machine comprising: at least one piston/cylinder unit, each unit comprising:

a first cylinder and a first piston arranged to oscillate within said first cylinder along a longitudinal axis of said first cylinder;

a crankshaft; and a connecting rod coupling said first piston to said crankshaft, wherein said first piston and part of said connecting rod oscillate thereby producing free inertial forces in the direction of the longitudinal axis of said first cylinder;

said reciprocating machine further comprising an oscillatory spring/balancing mass system comprising;

a second cylinder having first and second ends;

a balancing mass positioned within said second cylinder displaceable back and forth through a stroke with time to produce balancing inertial forces at least approximately counterbalancing the free inertial forces;

first and second oscillatory springs, said first oscillatory spring comprising the first end of said second cylinder and said second oscillatory spring comprising the second end of said second cylinder, and wherein said second cylinder is delimited by at least one second piston displaceable in a gas-tight manner in said second cylinder to modify the force applied by said spring to said balancing mass per unit distance displacement of said balancing mass;

an oscillatory drive disposed to effect an oscillatory excitation on said oscillatory spring/balancing mass system from its rest position at a multiple of the frequency of the crankshaft depending upon the order of the free inertial forces to be neutralized, said oscillatory drive having a phase position relative to said oscillatory spring/balancing mass system; and means for varying said stroke of said oscillatory spring/balancing mass system by displacement of said phase position of said oscillatory drive relative to the oscillatory spring/balancing mass system;

wherein force applied by said spring to said balancing mass per unit distance displacement of said balancing mass varies in dependence upon the speed of rotation of the reciprocating machine so that a fundamental frequency of the oscillatory spring/balancing mass system follows the speed of rotation of the reciprocating machine synchronously whereby the energy exchanged with said oscillatory spring/balancing mass system is controlled to neutralize the free inertial forces.

* * * * *

UNITED STATES PATENT AND TRADEMARK OFFICE
CERTIFICATE OF CORRECTION

PATENT NO. : 6,029,541

DATED : February 29, 2000

INVENTOR(S) : Peter Schrick, et al.

It is certified that error appears in the above-identified patent and that said Letters Patent is hereby corrected as shown below:

On the title page, Item [56], under "FOREIGN PATENT DOCUMENTS" the reference "50-102842" should be --58-102842--.

Signed and Sealed this

Twenty-seventh Day of March, 2001

Attest:

NICHOLAS P. GODICI

Attesting Officer

Acting Director of the United States Patent and Trademark Office